S. PENNOCK.

ROAD SCRAPER.

No. 10,023. Reissued Jan. 31, 1882.

WITNESSES

Herman Moran.

A. M. Bright.

INVENTOR

S. Pennock.

By Leggett & Leggett

ATTORNEY

UNITED STATES PATENT OFFICE.

SAMUEL PENNOCK, OF KENNET SQUARE, PENNSYLVANIA.

ROAD-SCRAPER.

SPECIFICATION forming part of Reissued Letters Patent No. 10,023, dated January 31, 1882.

Original No. 194,367, dated August 21, 1877. Application for reissue filed September 19, 1881.

*To all whom it may concern:*

Be it known that I, SAMUEL PENNOCK, of Kennet Square, in the county of Chester and State of Pennsylvania, have invented a new and useful Improvement in Road-Scrapers, of which the following is a specification.

My invention relates to an improvement in road-scrapers, the object being to provide a machine of such construction that the scraper may be readily adjusted at any desired angle of inclination to impart the desired form or contour to the surface of the road or other surface to be operated upon. Further, to provide such a machine with an adjustable toothed bar, the latter to be arranged in such a manner that it will cut away the projecting and uneven portions of the surface before it is scraped.

With these ends in view my invention consists in the combination, with a frame supported by a single pair of carrying-wheels, of a scraper suspended beneath the frame, said scraper arranged diagonally to the axle, and projecting in front of one wheel and in rear of the other wheel, and suitable devices for imparting vertical adjustment to the opposite ends of the scraper, or for lowering or raising the scraper.

My invention further consists in certain other details of construction and combinations of parts for securing the scraper in place, and imparting vertical adjustment thereto, as will hereinafter be described, and pointed out in the claims.

My invention further consists in the combination, with a scraper, of a pivoted toothed bar located at one side of the scraper, and means for imparting vertical adjustment thereto.

Figure 1:
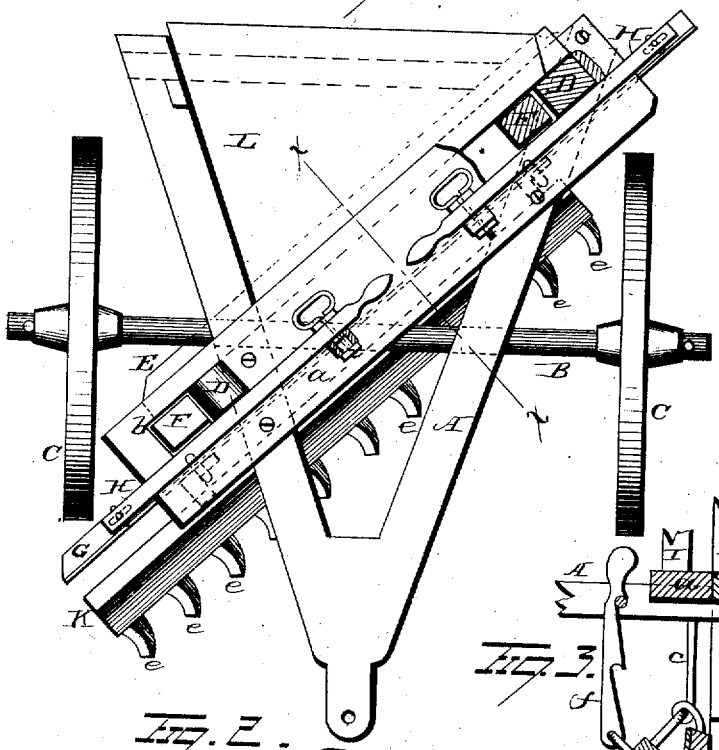
Figure 3:
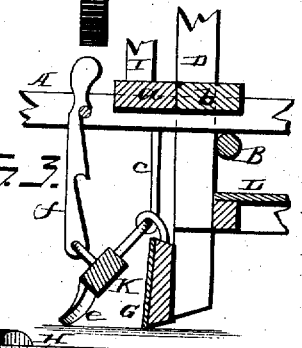
Figure 2:
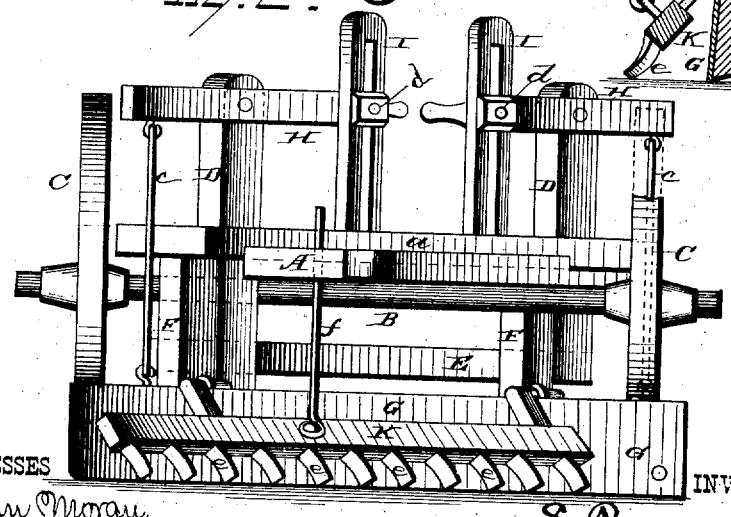

In the accompanying drawings, Figure 1 is a plan view of my improved road-machine. Fig. 2 is a front elevation, and Fig. 3 is a transverse section in line *x x* of Fig. 1.

A is a triangular frame, secured to the axle B, which latter is supported by the carrying-wheels C. Two bars, *a* and *b*, are secured to the frame A, being placed diagonally on the frame, and two vertical standards, D, are fastened between the bars *a b*, and extend downward below the axle B, and to them a bar, E, is attached, which extends a short distance beyond the standards to support the guide-pieces F, that are pivoted to the scraper-bar G. The pieces F extend upward through the bars *a b* at the front side of the standards D. A lever is pivoted to each of the standards D, and connected by rods *c* with the ends of the scraper-bar G. The levers H are each provided with a clamping-screw, *d*, by which they are clamped to the slotted standards I, that are pivoted to the bar *a*. By means of the levers H either end of the scraper-bar G may be raised or lowered.

K is a bar, having attached to it the curved teeth *e*, which are set diagonally on the bar. This bar is hinged to the scraper-bar G, and is provided with a rod, *f*, by which it may be raised and sustained.

The front end of the triangular frame A is connected with the front axle of a common wagon by means of the king-bolt, and the machine is drawn forward by any required number of horses.

By operating one or the other of the levers H the end of the scraper-bar may be raised, so that by driving up on one side of the road and down on the other the road may be ridged or rounded, as may be desired; or by arranging the scraper-bar in a horizontal position the road may be made level. The bar K is adjusted so that its teeth *e* cut away the projecting and uneven portions of the surface before it is scraped.

By suspending the scraper from the frame A beneath the axle and diagonally thereto, in the manner shown, it will be observed that the load is disposed practically in an even manner on both the front and rear sides of the axle, which arrangement of parts enables the scraper to be readily and easily handled and governed, and, further, results in retaining the scraper against undue variation in its adjustment by reason of the wheels traveling over uneven ground.

The platform L, upon which the driver stands, is supported partly by bar E and partly by a light frame suspended from the triangular frame A. The bar K may be placed either before or behind the scraper-bar; and it may be adjusted by means of a lever, or in any other convenient way.

I am aware that road-scrapers have been invented wherein the scraper is suspended from a frame supported on the front and rear axle of a truck; and also that the scraper has been rigidly secured to a frame mounted on a crank-axle. Hence I make no claim to such construction and arrangement of parts. In my improved road-scraper the scraper is suspended from a frame connected with a single axle, and the scraper is provided with devices whereby its ends may be independently adjusted. This insures a more perfect adjustment than is possible where two axles are employed, as in the latter case as the front axle rides over a raised surface the front of the scraper is raised, while in my invention the scraper is carried practically level, but may have its ends independently adjustable for various kinds of work.

Having fully described my invention, what I claim as new, and desire to secure by Letters Patent, is—

1. The combination, with an axle and a frame connected therewith, of a scraper suspended at its ends beneath the axle and arranged diagonally thereto, practically one half of the length of the scraper being located in front and the other half in rear of the axle, and devices for adjusting the ends of the scraper independently of each other, substantially as set forth.

2. The combination, with a frame connected with an axle supported by carrying-wheels, of the scraper-bar G, rods *c*, slotted pivoted standards I, standards D, and levers H, substantially as set forth.

3. The combination, with a scraper, of a pivoted toothed bar located parallel to the scraper, and means for imparting vertical adjustment to said toothed bar, substantially as set forth.

4. The combination, with a scraper, of a pivoted toothed bar located parallel to the scraper, and means for raising said bar and locking it out of operative position, substantially as set forth.

5. The toothed bar K, pivoted to the scraper G and connected with the pivoted rod *f*, substantially as set forth.

In testimony that I claim the foregoing I have signed this specification in the presence of two subscribing witnesses.

SAMUEL PENNOCK.

Witnesses:
C. J. PENNOCK,
WILLIAM W. POLK.